United States Patent [19]

Maher

[11] Patent Number: 4,882,651
[45] Date of Patent: Nov. 21, 1989

[54] MONOLITHIC COMPOUND-CERAMIC CAPACITOR

[75] Inventor: Galeb H. Maher, North Adams, Mass.

[73] Assignee: Sprague Electric Company, North Adams, Mass.

[21] Appl. No.: 279,739

[22] Filed: Dec. 5, 1988

[51] Int. Cl.$^4$ .......... H01G 4/10; H01G 4/42; H01G 7/00

[52] U.S. Cl. .......... 361/321; 29/25.42; 252/62.3 BT

[58] Field of Search .......... 264/60, 61, 67; 29/25, 29/42; 501/134–137; 361/320, 321

[56] References Cited

U.S. PATENT DOCUMENTS

| | | | |
|---|---|---|---|
| 4,284,521 | 8/1981 | Payne et al. | 252/62.3 BT |
| 4,302,625 | 11/1981 | Hetherington et al. | 174/68.5 |
| 4,424,615 | 1/1984 | Wakino | 29/25.42 |
| 4,533,974 | 8/1985 | Maher | 361/320 |
| 4,556,929 | 12/1985 | Tanaka et al. | 361/321 |
| 4,620,264 | 10/1986 | Ushifusa et al. | 361/414 |
| 4,650,648 | 3/1987 | Beer et al. | 252/62.3 BT X |
| 4,764,357 | 8/1988 | Sherif et al. | 501/134 X |

Primary Examiner—Donald A. Griffin

[57] ABSTRACT

A green ceramic cake is formed comprised of a center layer of fine-ceramic particles sandwiched between two outer layers of relatively coarse-ceramic particles. However, the chemical compositions of the center and outer layers are all essentially the same. The center layer contains a stack of spaced-apart film-patterns of electroding ink. This cake is separated into many individual green monolithic-ceramic capacitors each with electrodes extending conventionally to opposite ends thereof. These capacitors are sintered to mature the ceramic, and conductive terminations are formed at the opposite ends contacting the buried electrodes. The finer start powder of the center layer is relatively expensive, but the resulting fine grain homogenous grain structure there in the finished capacitor permits closely spaced buried electrodes and generally a higher quality dielectric due to greater density and more homogenous composition than is achieved in the cheaper outer layer material.

12 Claims, 1 Drawing Sheet

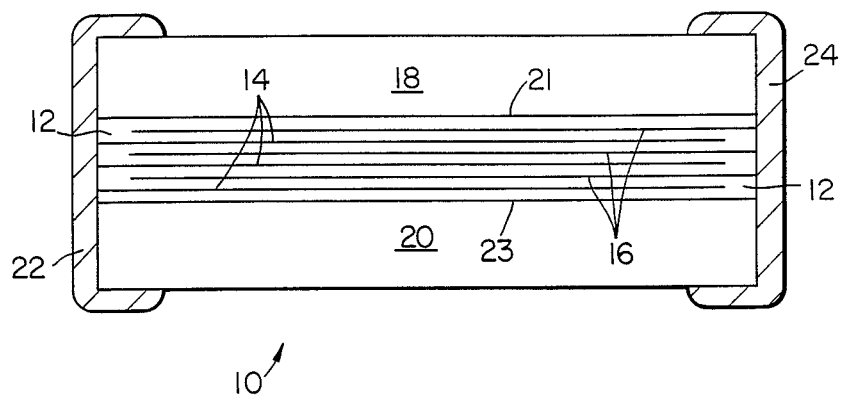

MONOLITHIC COMPOUND-CERAMIC CAPACITOR

BACKGROUND OF THE INVENTION

This invention relates to monolithic ceramic capacitors and more particularly to such capacitors in which the capacitor electrodes are buried in a fine grained high dielectric-quality center layer that is sandwiched between two relatively low cost and coarse grained outer layers.

In the patent to Cipollini, U.S. Pat. No. 4,654,075, issued Mar. 31, 1987 and assigned to the same assignee as is the present invention, there is disclosed an emulsion-char method for making fine ceramic powder. The powder made by this method and other wet processes has smaller and more spherical particles and tends to have a much more narrow distribution of particle sizes than do powders made by the long conventional method of thermally reacting powdered oxides and oxide precursors of the wanted ceramic compound. Such fine and almost single-particle-size powders are sometimes described as mono-disperse powder. Furthermore, each particle of the fine powder made by the Cipollini method has the wanted chemical composition unlike in the conventionally produced powder particles and, therefore, the fine powder has a near ideal chemical homogeniety.

These characteristics of emulsion-char derived powders lead to lower cost capacitors or better capacitor dielectric properties, or both. For example, the finer particles are more reactive and can be fully densified at a lower sintering temperature, permitting the use of otherwise excluded lower melting, less expensive buried metal electrodes. The chemical homogeniety is carried along to the sintered capacitor dielectric ceramic leading to higher dielectric constant, K, and better control of K and the temperature coefficient of K as well as higher breakdown voltages and lower Q. But perhaps the most important advantage is the submicron particle size that permits the use of unusually thin active dielectric layers between electrodes. Such closely spaced electrodes, e.g. down to 0.2 mils (5 microns) in a ceramic of given K, are now made possible whereas 1 and 2 mil (25 and 50 microns) spacing has been the rule using the best of relatively coarse conventionally made powders.

However, conventionally made powders having relatively large powder particles are much less expensive to make than are the fine powders.

It is an object of this invention to provide a low cost compound-ceramic monolithic capacitor in which the capacitor electrodes are buried in a high-quality fine-grained center layer that is sandwiched between two relatively coarse-grained low cost outer layers to provide added thickness to facilitate handling and to contribute strength to the fine-grained center layer.

SUMMARY OF THE INVENTION

This invention recognizes that capacitors having very closely spaced electrodes buried in an expensive fine grained ceramic layer require fewer electrodes, occupy less space and tend to be thinner than required for conventional wide-spaced-electrode capacitors for both reasons, but more of the same expensive ceramic material would normally be added to bring the capacitor body thickness up to a dimension that would insure strength enough for handling making the capacitor much more expensive.

A monolithic ceramic capacitor of this invention has one layer of a mature polycrystalline ceramic having a narrow and homogenous distribution of grain sizes. A stack of at least two spaced-apart conductive film electrodes are buried in he one ceramic layer in mutual compacitive relationship. Two ceramic layers each comprised of a mature polycrystalline ceramic are located, respectively, on opposite surfaces of the one layer and are sinter-bonded thereto. The ceramic of the two outer layers is of essentially the same composition as the center layer but is of a conventional powder kind having a coarser, and distinctly broader and less homogenous distribution of grain sizes than that of the one layer.

The two outer layers, having been made from a conventional coarser start material, have identical chemical composition, grain structure and preferably are of the same thickness, all with respect to each other.

To reach a given capacitance value, close spacing, e.g. 0.75 mils (19 microns) or less is preferred to reduce the number of electrodes required and therefore reduce the thickness of the expensive inner layer. The grains of the inner layer are for that purpose kept small, e.g. average grain size less than half a mil. That average grain size of the center layer will preferably be substantially smaller than that of the conventional but low cost material of the outer layers.

It is also greatly preferable that the inner and outer layers be of essentially the same chemical composition so that the temperature expansion coefficients of inner and outer layers will be very nearly the same and so that there will be no significant reaction band formed at the interface between adjacent inner and outer layers.

The term "essentially the same" as applied herein to the composition of the center and outer layers is defined as nearly enough like same to produce no reaction band at the interfaces between the inner fine-grained layer and either outer coarse-grained layer. As a practical matter, any band should be no thicker than the spacing between capacitor electrodes in the center layer. Wider reaction bands may degrade the predictability of capacitance value and thus the practical minimum distance (one active dielectric thickness) between an interface and the nearest capacitor electrode.

BRIEF DESCRIPTION OF THE DRAWING

The figure shows in side sectional view a monolithic compound-ceramic capacitor of this invention.

DESCRIPTION OF THE PREFERRED EMBODIMENTS

The capacitor 10 illustrated in the drawing has a layer 12 of mature polycrystalline ceramic. Capacitor electrodes 14 and 16 are buried in the ceramic layer 12.

Two layers 18 and 20 of a different mature polycrystalline ceramic than in layer 12 are sinter-bonded to top and bottom (as shown) faces of the layer 12. At the junctions between the inner layer 12 and the outer layers 18 and 20, respectively, there are formed co-bonded interfaces 21 and 23. A conductive termination 22 is formed on the left (as shown) end of the capacitor 10 contacting the buried electrodes 14 that extend to that end. A conductive termination 24 is formed on the right end of capacitor 10 contacting buried electrodes 16 that extend to that right end.

Experimental capacitors of this kind were made as follows.

A first slurry-vehicle was prepared by forming a mixture of 30% by volume amyl alcohol and 70% xylene. A slurry was made by combining 485 grams of a fine high purity near-mono-disperse barium titanate powder with an average particle size larger than 1 micron, 5 grams of a fine near-mono-disperse powdered oxide of niobium having an average particle size considerably less than 1 micron (i.e. about 0.2 micron), 10 grams of a powdered cadmium silicate sinteringflux having an average particle size of about 2.0 microns, 5 grams of an organic surfactant; namely GAFAC 410, and 50 grams of the amyl alcohol/xylene vehicle. The slurry was ball milled for ten hours. There was then added 163 grams of an organic binder and 7 grams of an organic plasticiser, MORFLEX 190.

A second slurry was prepared by combining 45 grams of the above-noted amyl alcohol and xylene, 4 grams of the surfactant GAFAC 410, 5 grams of the niobium oxide powder, 10 grams of the same cadmium silicate sintering flux $5CdO.2SiO_3$ and 485 grams of a barium titanate powder having been made by the traditional process of thermally reacting a powder mixture of oxides (e.g. BaO and $TiO_2$) or oxide precursors (e.g. $BaCO_3$). This barium titanate powder has an average particle size of about 2 microns and a wide distribution of particle sizes between the 2 sigma points of about 0.5 microns to 5 microns.

The second slurry containing conventional coarse powder was then poured into a curtain coating machine of the kind described by Coleman in U.S. Pat. 4,060,649 issued Nov. 29, 1977 and assigned to the same assignee as is the present invention. A flat supporting substrate having a porous paper cover layer was passed through the falling curtain of slurry at a speed that effects a slurry deposit of 0.6 mils (15.2 microns) thickness on the substrate. This deposit was dried to remove the volatile vehicle components, and passed through the curtain and dried eleven more times to form a green ceramic layer, to become layer 20.

The curtain coating machine was loaded with the first slurry including the fine nearly monodisperse powder. The substrate carrying the dried fine-powder slurry and buried electrodes was twice passed through the curtain at a speed to deposit a 0.4 mil (10.2 microns) slurry film, each film being dried before the next pass through the curtain.

An electroding ink, comprising a powder of a silver/palladium alloy and an organic vehicle was selectively deposited by screen printing on the surface of the two dried-slurry films, to form the first of the buried electrodes 14. A plurality of capacitors of this invention were being formed at the same time and the pattern of the screened ink therefore consisted of a matrix of first electrodes 14. The substrate was then repeatedly passed through the slurry curtain, the slurry deposit dried and an electroding ink pattern put down, nine more times to form ten electrodes (14 and 16). The drawing figure for convenience shows only six electrodes (14 and 16). Thus each electrode film pattern is separated from the adjacent ones by a 0.4 mil thick layer of dried slurry. Now two more 0.4 mil dried slurry layers are deposited over the last screened electrode.

Operating the curtain coating machine loaded with the coarse first slurry, the substrate was again passed through the curtain twelve times, drying after each pass as before, to build two equally thick outer layers (to become layers 12 and 24) of dried coarse-powder slurry on opposite sides of the dried fine-powder slurry.

This assembly was then diced to separate it into a plurality of individual green-ceramic capacitors by the method described by Harland et al in U.S. Pat. No. 4,577,144 issued May 14, 1985 and assigned to the same assignee as is the present invention.

These green capacitors were sintered for two hours at 1100° C. to within 98% of theoretical density. Each mature ceramic body had each of two ends dipped into a silver terminating paste which was heated to about 400° C. to cure the paste and form capacitor terminations 22 and 24 as shown in the drawing figure.

Almost any other ceramic composition than barium titanate may be used to make compound ceramic capacitors of this invention. For example, it would be advantageous for making a high capacitance capacitor with a low temperature coefficient of capacitance, TCC, (e.g. a COG TCC), to use a high dielectric-constant COG rare earth titanate such as a neodymium barium titanate for inner and outer layers.

When expensive ingredients such as the rare earths are called for in the center layer of ceramic, an additional cost reduction may be realized by using a different chemical composition for the outer ceramic layers that exclude such expensive ingredients as neodymium, provided the thermal coefficients of expansion of those different ceramics are within about one order of magnitude of each other and there is essentially no interface reaction zone. In a patent application U.S. Ser. No. 07/279,740 that is filed simultaneously herewith and is entitled "A Magnesium Titanate Ceramic and Dual Dielectric Substrate Using Same", there is described a substrate comprised of co-fied center and outer ceramic layers of different compositions, but not necessarily having disparate grain structures.

What is claimed is:
1. A monolithic ceramic capacitor comprising:
   (a) one layer comprising a mature polycrystalline ceramic having a narrow and homogenous distribution of grain sizes;
   (b) a stack of at least two spaced-apart conductive film electrodes buried in said one layer; and
   (c) two outer layers comprising a mature polycrystalline ceramic, each of said two layers located on opposite surfaces of said one layer and being co-reacted and bonded thereto, said ceramic of said two layers having a distinctly broader and less homogenous distribution of grain sizes than that of said one-layer ceramic.

2. The capacitor of claim 1 wherein the chemical composition and grain structure are essentially the same in said two outer layers.

3. The capacitor of claim 2 wherein the thicknesses of said two outer layers are essentially the same.

4. The capacitor of claim 1 wherein said electrodes are spaced apart by less than 0.75 mil (19 microns) and the grains of said one-layer ceramic are smaller than 0.5 mil (12.7 microns).

5. The capacitor of claim 1 wherein said electrodes are spaced apart by less than 0.5 mil (12.7 microns) and the grains of said one-layer ceramic are smaller than 0.33 mil (8.5 microns).

6. The capacitor of claim 1 wherein the average grain size of said one layer is substantially less than that of said two outer layers.

7. The capacitor of claim 1 wherein the composition of said two outer layers is essentially the same as the composition of said one-layer and have essentially the same temperature coefficient of expansion.

8. The capacitor of claim 7 wherein said composition of said one layer and said two layers is a barium titanate.

9. The capacitor of claim 7 wherein said composition of said one layer and said two layers is a rare-earth titanate.

10. The capacitor of claim 1 wherein said one-and two-layers are additionally comprised of a sintering flux, selected from silicates, borates and combinations thereof, said flux being located at the grain boundaries of said polycrystalline ceramics.

11. A method for making a monolithic ceramic capacitor comprising:
   (a) forming one green ceramic layer comprising submicron particles of one ceramic composition and an organic binder binding said submicron particles together, and a stack of at least two spaced apart conductive film electrodes buried in said one green layer;
   (b) forming on opposite surfaces of said one green layer, respectively, two green ceramic layers each comprising large particles of essentially the same ceramic composition and an organic binder binding said large particles together, said large particles having an average particle size greater than one micron; and
   (c) co-sintering said green layers to simultaneously densify and mature said one and said two ceramic layers.

12. The method of claim 11 wherein said ceramic composition is a barium titanate.

* * * * *